(12) United States Patent
Morrison et al.

(10) Patent No.: X6965
(45) Date of Patent: Mar. 14, 1832

(54) WASHING MACHINE, & SCOURING

(76) Inventors: Noah Morrison; John Lewis

Noah Morrison & John Lewis of the Borough of Union Town
State of Pennsylvania.

Letters Patent.

The schedule referred to in these Letters Patent and making part of the same
containing a description in the words of the said Noah Morrison & John
Lewis themselves of their improvement in the machine for Washing Clothes
which they denominate, the Horizontal double Washing & Scouring Machine To all to whom these presents shall come –
Be it known that We Noah Morrison and John Lewis of the Borough of
Union town in the County of Fayette & State of Pennsylvania, have invented
a new and useful improvement in a Machine for washing Clothes, called
the Horizontal double dasher Washing and Scouring Machine & that the
following is a full and exact description of the construction and operation
of said Machine as invented or improved by us
It consists of a Chest or box four feet in length one foot six inches in
width and thirteen inches in depth, that is in the clear, or measuring its
inner surfaces - but in this may be varied at pleasure provided the machin
ery within as to size in a corresponding ratio. It is contemplated that
the chest shall stand upon legs or feet, of any length to suit the con-
venience of the place or the operator. The chest is made perfectly tight.
with a false bottom, at three fourths of an inch above the true one, this false
bottom to be perforated with small holes, so as to admit the water, [illegible]
or dirt to ~~descend~~ through them, the false bottom terminates at each end
with an apron or circle rising from it and [illegible] with a Radius
of three inches until it equals one fourth of an entire circle, the ends
are from the Aprons, continued by a circular bust of nine inches Radius
formed of perpendicular ribs with intervals between them of one fourth of
an inch less or more – These ribs are fastened at top, and rest
against the aprons so as to have a slight spring in working the openings be-
hind, the ribs continue behind the aprons into the space below the false bottom, so as to allow the water, sediment, or dirt to descend as before mentioned
The chest is closed with folding lids, so as to retain the heat or steam
and prevent wastage or slop. Within the chest, or box near its centre
but may be inclined towards one end or the other is placed a double
crank formed of iron or other metal, upon a spindle resting on gudgeons in
opposite sides of the chest, or box with two pitmen in length one foot each, but
which may be shortened or lengthened if necessary.
To each of these Pitmen is annexed a Dasher, formed of wood and to which
they give a Horizontal motion but in opposite directions, so that when
one glides to the right, the other moves to the left, and vice versa
The Dashers are formed of wood two feet nine inches in length at
bottom and one foot three inches at top, and sloped from the upper surface to
each end with mouldings at bottom and top of slopes.
The depth of dashers should be eight inches and the width one half each
of the width of the chest, or box, or about nine inches allowing sufficient
space for them to pass each other without friction, the faces of the dashers
are ribbed. A plug at bottom serves to draw the water and sediment as
often as necessary. The dashers glide over the false bottom upon
rollers inserted between, so as to bring the lower part of the dashers near
-ly in contact with the false bottom, and better to be placed on an Iron,
steel or brass treads. The spindle passes through the side of the chest
in front, on its end is fixed a cog wheel six inches in diameter, but may
be increased or reduced in size, and at the proper distance is attached to the
side of the Chest, another cog wheel whose diameter is one foot, but it may
be increased or reduced at pleasure, as an increase or decrease of motion
is desired and which unites with and gives motion to the upper wheel
The larger wheel is turned by a crank or arm of one foot in length
but may be increased or diminished. In place of a cog wheel
motion can be given to the machine by means of a strap [illegible] wheel
or cylinder as may be preferred. Clothes [illegible] to be washed are placed
in either end of the chest and by turning the crank or arm a quick
motion is given to the Dashers. The clothes are [illegible] against the
[illegible] or [illegible], and by the formation of the Dashers [illegible] they are

United States Patent

Patent No.: X6965 made to scratch so as to present in succession every part to the contact of the
leathers, and thus are speedily cleaned without injury; the same prin-
ciple may be applied to the machine so as to act for use at one end of
the box only Noah Morrison.
Sam Lewis.

Witnesses
James Piper.
Andw Hastings.

Exd.
C.J.W.